INVENTOR
George B. Greene.
Gunnar Wahlstrom.
BY
Robert W. Hampton

INVENTOR
George B. Greene.
Gunnar Wahlstrom.
BY
Robert W. Hampton

INVENTOR
George B. Greene.
Gunnar Wahlstrom.
BY
Robert W. Hampton

INVENTOR
George B. Greene.
Gunnar Wahlstrom.
BY Robert W. Hampton

United States Patent Office 2,867,797
Patented Jan. 6, 1959

2,867,797

ANALOG-TO-DIGITAL CONVERTERS

George B. Greene, Berkeley, and Gunnar Wahlstrom, San Francisco, Calif., assignors to Marchant Research, Inc., a corporation of California Application March 9, 1954, Serial No. 415,004

13 Claims. (Cl. 340—347)

The present invention relates to analog-to-digital converters which receive analog values and translate them into equivalent digital representations for use in electronic digital computers or the like.

Digital computers are often required to operate upon values which originally were in analog form. It is therefore necessary to provide means for converting an analog value, as represented, for example, by a voltage amplitude, into its equivalent digital representation. There are many forms in which a digital value may be represented, the choice of the particular form being determined by the nature of computer which is to receive the representation. The present invention will be described, by way of illustration, in the environment of a computer in which digital values are expressed serially in the binary system, and in which each multi-digit binary value, or "word," is represented by a serial pulse pattern, wherein the presence of a pulse during any of a series of substantially equal time intervals, called "digit intervals," represents the digit 1, while the absence of a pulse during any such interval represents the digit 0. Such a computer is disclosed in "A Functional Description of EDVAC," volumes I and II, by the Moore School of Electrical Engineering at the University of Pennsylvania, Philadelphia, Pennsylvania, November 1, 1949, Research Division Report 50–9.

A large number of mechanical and electronic devices have been proposed for performing analog-to-digital conversion, but such mechanical devices are limited in speed of operation by the inertia of moving parts, while electronic devices which have been proposed for circumventing the inertia limitation either have been bulky and extremely expensive, or have sacrificed accuracy. A significant approach to the conversion problem was disclosed in the Italian Patent 437,300, issued to Frederick Llewellyn and published June 30, 1948. The Llewellyn device employs a cathode ray tube having an electron gun which projects a beam through a mask containing rows of apertures which are arranged in a pattern representing the binary system. The beam is caused to sweep across the mask at a level controlled by the amplitude of an input voltage which represents an analog value. The beam sweeping along a row produces an output signal in the form of a unique pulse series representing a digital binary word which is equivalent to the analog value. In the Llewellyn device, a change in the amplitude of the analog voltage while the beam is sweeping a particular row of the pattern may cause the beam to cross to another row, thereby introducing a large error into the binary output signal. The reason for this error becomes evident in noting that in the binary system, a unit change in a word can cause a simultaneous change in several ordinal digits of that word. For example, if the binary word 0111 is increased by unity it becomes 1000. In the Llewellyn device, if a change in the voltage amplitude representing an analog value causes the beam to cross from the "0111" row to the "1000" row during the sweep, the resulting binary word may be 0000, 0100 or some other value greatly removed from either of the two most accurate words. Therefore, the Llewellyn device is unreliable for producing accurate binary representations of rapidly fluctuating amplitude samples.

In United States Patent 2,632,058 issued to Frank Gray on March 17, 1953, there is disclosed a similar device employing a cathode ray tube that has a mask containing rows of apertures arranged in a pattern based on the "reflected" binary system. In this system, the digital representation of a word changes in only one order when there is a unit change in the value of the word. The Gray device encodes a voltage amplitude, which represents an analog value, into an equivalent digital pulse pattern expressed in the reflected binary system, and translates the resulting digital word into the conventional binary system beginning with most significant ordinal digit of the word. The translation from reflected to conventional binary, beginning with the most significant digit of a word, is adequate in a pulse code communication system of the type disclosed by Gray, but if the translated words are to be introduced into a serial-type digital computer, it is manifestly desirable that they appear lowest digit first, because such computers ordinarily operate upon words by successively higher order digits. Therefore, if Gray's device were to be employed as a computer word source, the digits of each word would have to be entered into the computer in an order which is the reverse of the order in which they were formed. A converter of this type would obviously require complex storing and transmitting facilities for receiving words in one ordinal sequence and transmitting them in the opposite ordinal sequence.

Therefore, a principal object of the present invention is to provide an analog-to-digital converter which is not subject to the foregoing limitations.

A further object is to provide means for converting an analog value into an equivalent digital word wherein the least significant digit occurs first in time.

Further objects of the invention are:

To control the operation of an encoder by means of a computer or the like;

To provide encoding means wherein a digital reflected binary representation of a value is produced from a coded target plate of a cathode ray tube whose beam deflection in one plane is controlled in response to an analog representation of said value;

To detect true and complementary conventional binary representations of successive words, and to transmit all of such representations in true form; and To provide an improved analog-to-digital converter.

Other objects will appear in the following description, reference being made to the accompanying drawings in which.

REFLECTED BINARY SYSTEM

The two lowest-value words in the reflected binary system are identical to the two lowest-value words in the conventional binary system, viz., the respective digits 0 and 1. The third and fourth reflected binary words are formed by establishing a "reflection" of the first two words and then removing the resulting ambiguity by placing the digit 1 in the next higher order of the word, as follows:

| Reflected Binary | Decimal Equivalent |
|---|---|
| 0 0 | 0 |
| 0 1 | 1 |
| — — | — |
| 1 1 | 2 |
| 1 0 | 3 |

The same process is used to form successively higher-value words:

| Reflected Binary | Decimal Equivalent |
|---|---|
| 0 00 | 0 |
| 0 01 | 1 |
| 0 11 | 2 |
| 0 10 | 3 |
| — — | — |
| 1 10 | 4 |
| 1 11 | 5 |
| 1 01 | 6 |
| 1 00 | 7 |

To convert any reflected binary word into the equivalent conventional binary word, least significant digit first, the following equations can be derived: Let $C_1$, $C_2$, $C_3$ . . . $C_n$ represent the respective digits in the successively higher orders of a word expressed in the conventional binary system, and let $R_1$, $R_2$, $R_3$ . . . $R_n$ represent the respective digits in the successively higher orders of the equivalent word expressed in the reflected binary system. Then:

(1) $C_n$=(the lowest order digit of the conventional binary sum: $1+R_1+R_2 \ldots R_{n-2}+R_{n-1}$), if an odd number of R's in the entire reflected binary word equal 1, or (2) $C_n$=[1−(the lowest order digit of the conventional binary sum: $1+R_1+R_2 \ldots R_{n-2}+R_{n-1}$)], if an even number of R's in the entire reflected binary word equal 1.

GENERAL DESCRIPTION

In the present invention, a voltage which is derived from an outside source such as a mass spectrometer, and which is an analog representation of a value, is amplified and employed to control the beam of a cathode ray encoder tube. The encoder tube produces an output pulse train representing a reflected binary word which is a predetermined function of the analog value. In the reflected binary pulse train, the least significant digit of the word is represented first in time. The pulse train enters a translating circuit and is therein translated into a second pulse train representing either the equivalent conventional binary word or its complement. The conventional binary word, or its complement, is then stored in a memory device such as a register, until the word is needed by the computer. At any desired time, the stored word is entered into the computer through a complementer which transmits each word to the computer in true conventional binary form.

Figure 1:
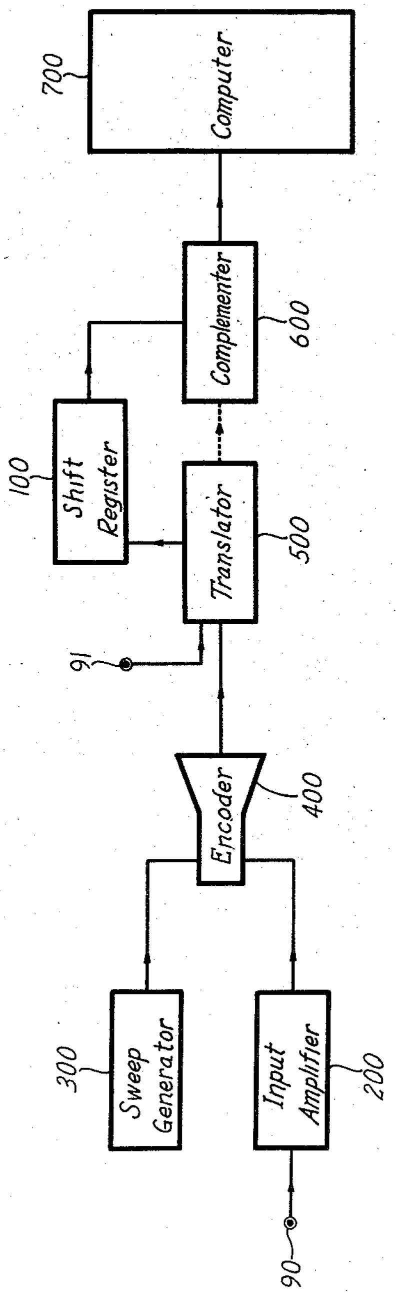
Fig. 1 is a block diagram of the analog-to-digital converter.

Referring to Fig. 1, an analog voltage signal is applied to an input terminal 90 and through the input amplifier 200 to the deflection system of the cathode ray encoder tube 400. At the same time, a sweep generator 300 transmits a second deflection signal to the encoder tube.

The two deflection signals cause the beam of tube 400 to sweep a patterned target plate, thereby producing a pulse train representing a reflected binary word which is some predetermined function of the analog voltage applied to terminal 90.

The reflected binary pulse train from the encoder 400 is transmitted to and controls the translator 500 which also receives a series of clock pulses through a terminal 91. The clock pulses are gated by the translator 500, under control of the reflected binary pulse train from the encoder tube 400, and produce a pulse train which represents the conventional binary word that is equivalent to the reflected binary word output from the encoder tube. The conventional binary word may occur either in true representation or in complementary representation, as described hereinafter, and is stored in a shift register until it is required by some external unit, such as the computer 700. At any desired time, the stored word is shifted through the complementer 600 to the computer. The complementer is controlled by the translator in accordance with the true or complementary nature of the stored word. If the word was stored in true conventional binary, the complementer is disabled by the translator and merely transmits the word to the computer. However, if the word was stored in complementary form, it is recomplemented to its true form in the complementer while being transmitted to the computer.

CIRCUIT ELEMENTS

*Trigger circuit*

One of the basic elements employed in the present invention is a circuit having two stable states of operation, an example of which is the well-known Eccles-Jordan vacuum tube trigger circuit, described in "Theory and Application of Electron Tubes" by H. J. Reich. In one of its simplest forms, a trigger circuit comprises two triode vacuum tubes in which the grid of each tube is cross-coupled to the anode of the other tube through a respective network comprising a resistor in parallel with a capacitor. Such a circuit has two stable operating conditions, namely, with either of the two tubes conducting and its companion tube non-conducting.

Figure 2:
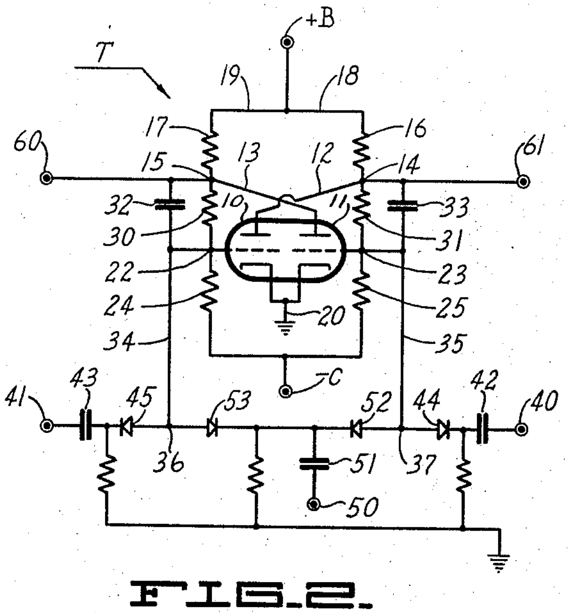
Fig. 2 is a circuit diagram of a typical trigger circuit as employed in the converter.

A standard modification of the Eccles-Jordan circuit is shown as T in Fig. 2. The trigger circuit T comprises two vacuum tube triodes 10 and 11, shown for convenience as the two sections of a twin triode. The left-hand tube 10 is hereinafter called the "0 side," and the trigger is said to be "reset" when the 0 side is conducting. The right-hand tube 11 is hereinafter called the "1 side," and the trigger is said to be "set" when the 1 side is conducting.

The 0 side anode is connected by a lead 12, a junction 14, a resistor 16, and a lead 18 to a terminal +B which is connected to a source of positive potential. Similarly, the 1 side anode is connected by a lead 13, a junction 15, a resistor 17, and a lead 19 to the terminal +B. The cathodes of both sides are connected by a common cathode lead 20 to ground.

The 0 side grid is connected through a junction 22 and a resistor 24 to a terminal −C which is connected to a source of negative grid bias potential. The 1 side grid is similarly connected through a junction 23 and a resistor 25 to the terminal −C. The 0 side grid is also connected by means of junction 22, a resistor 30 in parallel with a capacitor 32, and junction 15, to the 1 side anode, and the 1 side grid is connected by means of junction 23, a resistor 31 in parallel with a capacitor 33, and junction 14 to the 0 side anode.

A "set" input terminal 41 is connected by a capacitor 43, a diode 45, a junction 36, a lead 34, and junction 22, to the 0 side grid, and a "reset" input terminal 40 is similarly connected by a capacitor 42, a diode 44, a junction 37, a lead 35, and junction 23, to the 1 side grid. A "symmetrical" input terminal 50 is connected through a capacitor 51, two diodes 52 and 53, and junctions 37 and 36, respectively, to both the 0 and the 1 side grids.

A negative pulse applied to the symmetrical terminal 50 invariably reverses the trigger as follows: Assuming that the 0 side is initially conducting, a negative pulse applied to terminal 50 is transmitted through diode 53 to the 0 side grid, but is blocked from the 1 side grid for the following reasons. Since the 0 side is conducting, junction 23 is at a relatively low potential due to the anode current for tube 10 flowing through resistor 16. The circuit parameters and the potential value of the grid bias source $-C$ are so chosen that the relatively low potential of junction 23 is below ground potential by an amount at least equal to the amplitude of the input pulses applied to terminal 50. Therefore, the potential of the left-hand side of diode 52 cannot drop below the potential of the right-hand side of that diode in response to the pulse applied to terminal 50, and the pulse is blocked. The negative pulse applied to the 0 side grid decreases the conduction of the 0 side, so that the potential at junction 14 rises. This rise in potential is coupled by capacitor 33 to the 1 side grid to initiate conduction of the 1 side. The conduction of the 1 side lowers the potential at junction 15, thereby lowering the 0 side grid potential to further reduce the conduction of the 0 side. Conduction increases in the 1 side and decreases in the 0 side until a stable state is reached with the 1 side conducting at saturation and the 0 side fully cut off. Each subsequent negative pulse applied to terminal 50 similarly reverses conduction from one side to the other.

A negative pulse applied to the set terminal 41 sets the trigger to 1 if it is conducting on the 0 side, but has no effect on the trigger if it is already set to 1. Assuming once again that the trigger is conducting on the 0 side, a negative pulse applied to terminal 41 is coupled by capacitor 43, diode 45, junction 36, and lead 34 to the 0 side grid. Diode 53 blocks this pulse from the 1 side grid. The negative pulse on the 0 side grid causes conduction to reverse from the 0 side to the 1 side in the manner hereinbefore described. Similarly, a negative pulse applied to the reset terminal 40 resets the trigger to 0 if it is conducting on the 1 side, but has no effect on the trigger if it is already reset to 0.

The trigger circuit is adapted to control other devices by means of the changeable potential levels at junctions 14 and 15. When the trigger stands reset to 0, the potential at junction 15 is relatively high, while the potential at junction 14 is relatively low, the converse being true when the trigger stands set to 1. A pair of control output terminals 60 and 61, which are connected to junctions 15 and 14, respectively, are used for applying these potentials to other devices.

Figure 3:
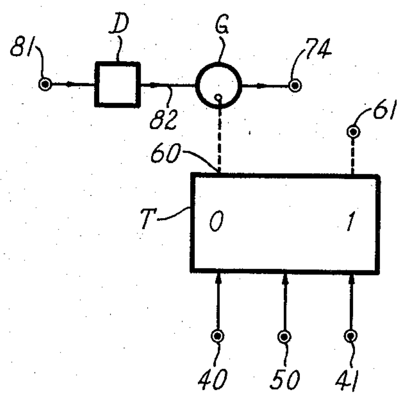
Fig. 3 is a block diagram showing typical relationships between the circuits shown in Figs. 2, 4 and 5.

In Fig. 3, the trigger circuit T is shown as a rectangle with the symmetrical input terminal 50 located at the bottom center of the rectangle and the reset and set input terminals 40 and 41 located at the bottom left and bottom right of the rectangle, respectively. The control output terminals 60 and 61 are shown at the top left and top right of the rectangle, respectively.

*Gate*

Figure 4:
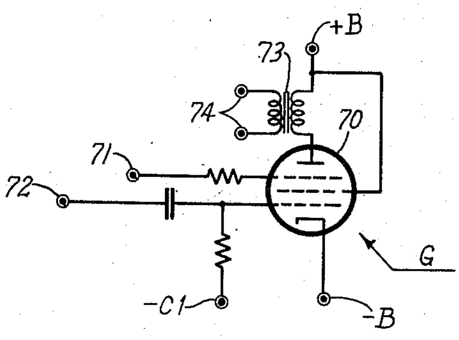
Fig. 4 is a circuit diagram of a typical single arming gate as employed in the converter.

A second element employed in the present invention is a controllable transducer such as a gate, an example of which is the well-known pentode gate shown as G in Fig. 4. Gate G comprises a pentode tube 70 which is normally biased well below cutoff by means of a control grid bias source $-C_1$. The bias of tube 70 can be raised to slightly below cutoff by a single arming control comprising a terminal 71 which is connected to the suppressor grid of the tube. In the present invention, each gate G is controlled by a trigger circuit, terminal 71 of the gate being connected to the appropriate control output terminal 60 or 61 of the trigger circuit (Fig. 2). When the control potential of the related output terminal 60 or 61 is low, tube 70 is biased well below cutoff, and the gate is said to be "closed," conversely, when the control potential becomes high, the bias of the tube 70 is raised to slightly below cutoff, and the gate is said to be "armed." Gate G is interrogated by positive pulses applied to a terminal 72 which is capacitively coupled to the control grid of the tube. If the gate is interrogated while it is closed, tube 70 remains cut off, but if the gate is interrogated while it is armed, the tube conducts, thereby energizing the primary winding of a pulse transformer 73 in the discharge circuit of the tube. According to the desired polarity of an output pulse from the gate, such a pulse may be taken from either of a pair of terminals 74 which are schematically shown as being connected to opposite ends of the secondary winding of transformer 73.

In Fig. 3, a gate G is shown as a circle having within it a smaller circle connected to the control output terminal 60 of the trigger circuit T. This represents a typical arming connection from a trigger, and indicates that gate G is armed when and only when the trigger T stands reset to 0. In the accompanying drawings, control leads are shown as broken lines, whereas pulse leads are shown as solid lines.

*Delay circuit*

Figure 5:
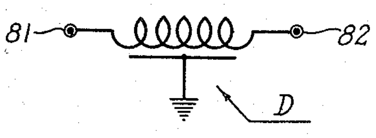
Fig. 5 is a schematic diagram of a typical delay line as employed in the converter.

A third element employed in the invention is a delay circuit, a typical example of which is shown schematically in Fig. 5 as a distributed parameter delay line of the type disclosed in Fig. 5 of U. S. Patent No. 2,467,857, issued April 19, 1949, to J. H. Rubel et al., to which reference is made for a full description. It is to be understood that other delay circuits, such as lumped parameter delay lines may be employed. Pulses impressed upon an input terminal 81 of delay line D are delayed a few microseconds or a fraction of a microsecond and appear at an output terminal 82. In Fig. 3, a delay circuit D is shown as a small square.

CIRCUIT UNITS

*Shift register*

Figure 6:
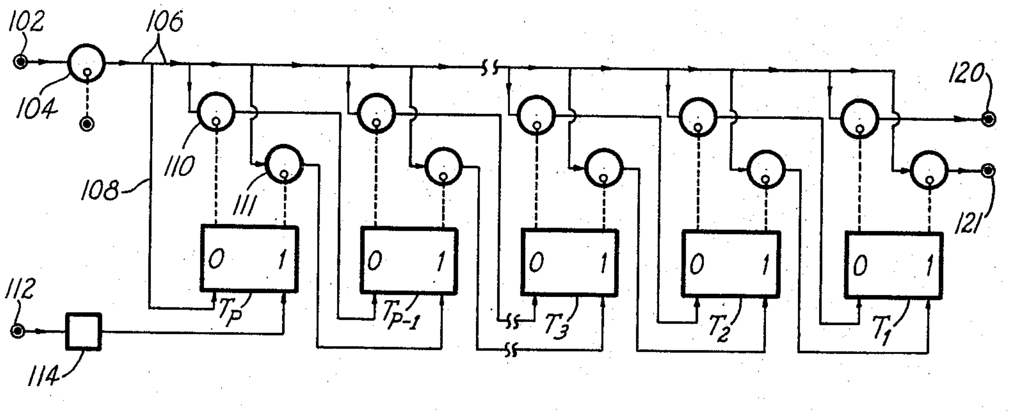
Fig. 6 is a block diagram of a typical shift register as employed in the converter.

The storage unit which is employed in the present invention may be, for example, a binary shift register, a standard form of which is shown in Fig. 6. This register comprises a plurality of value-storing stages, the number of stages being determined by the number of digits in the longest binary word that is to be stored in the register. By means of detecting the value in each stage and shifting that value to the next lower stage, the register is adapted to receive binary words from the translator 500 (Fig. 1) and transmit them to the complementer 600.

Referring to Fig. 6, the register comprises $p$ stages, the stages of higher significance being shown on the left. Each stage includes a respective trigger circuit $T_1$–$T_p$. Each trigger controls a pair of shift gates 110 and 111, the former being armed when the trigger stands at 0 and the latter being armed when the trigger stands at 1. A continuous series of clock pulses are applied to a terminal 102 from an appropriate pulse generator (not shown), one clock pulse being applied to terminal 102 at the beginning of each digit interval. The clock pulses on terminal 102 interrogate a gate 104 which is armed during selected word intervals for passing groups of clock pulses to a shift buss 106 that is connected to the interrogation input of each shift gate 110 and 111. The output terminal of each gate 110 is connected to the reset input terminal of the trigger in the next lower stage, while the output terminal of each gate 111 is connected to the set input terminal of the trigger in the next lower stage. Therefore, each clock pulse passes through the armed gate 110 and 111 of each stage and resets or sets the next lower stage accordingly. Although a trigger may be reversed by a clock pulse from the next higher stage, it requires a finite time to reverse; this permits the related shift gates to pass a clock pulse before the reversal occurs.

A binary word may be shifted into or out of the register digit-by-digit, starting with the lowest order digit, as follows.

Input words are received in the form of pulse trains, wherein the presence or absence of a pulse during each digit interval represents a 1 or a 0, respectively. The clock pulse that occurs at the beginning of each digit interval resets the highest stage trigger $T_p$ to 0, through a lead 108. Simultaneously with the occurrence of each clock pulse, a digit 1 or 0 of the input word is applied (by the presence or absence of a pulse) to an input terminal 112 which is connected through a delay circuit 114 to the set input terminal of $T_p$. Therefore, $T_p$ is always reset to 0 by a clock pulse at the beginning of each digit interval, but may be set to 1 during that interval by the receipt of a delayed pulse from terminal 112 representing an input digit of 1. If no pulse is applied to terminal 112 during a given digit interval, $T_p$ remains reset to 0, representing an input digit of 0.

For shifting a word out of the register, a pair of output terminals 120 and 121 are provided, these being the output terminals of the lowest stage shift gates 110 and 111, respectively. From the previous description of the shift gates, it is seen that a pulse appears on terminal 120 for each digit 0 that is shifted out of the lowest stage, and a pulse appears on terminal 121 for each digit 1 that is shifted out of that stage.

*Encoder*

Analog voltages are amplified and applied to one plane of the deflection system of a cathode ray encoder tube, while a second plane of the deflection system is controlled by a sweep voltage generator. The deflection in two planes causes an electron beam generated in the tube to sweep a target plate in a predetermined path. The target plate comprises conducting areas arranged in a pattern such that when the beam sweeps the target, the voltage of the latter varies in a time serial pulse pattern representing a reflected binary word which is a function of the applied analog voltage. The direction of sweep is such that the least significant digit of the word is produced first.

Figure 7:
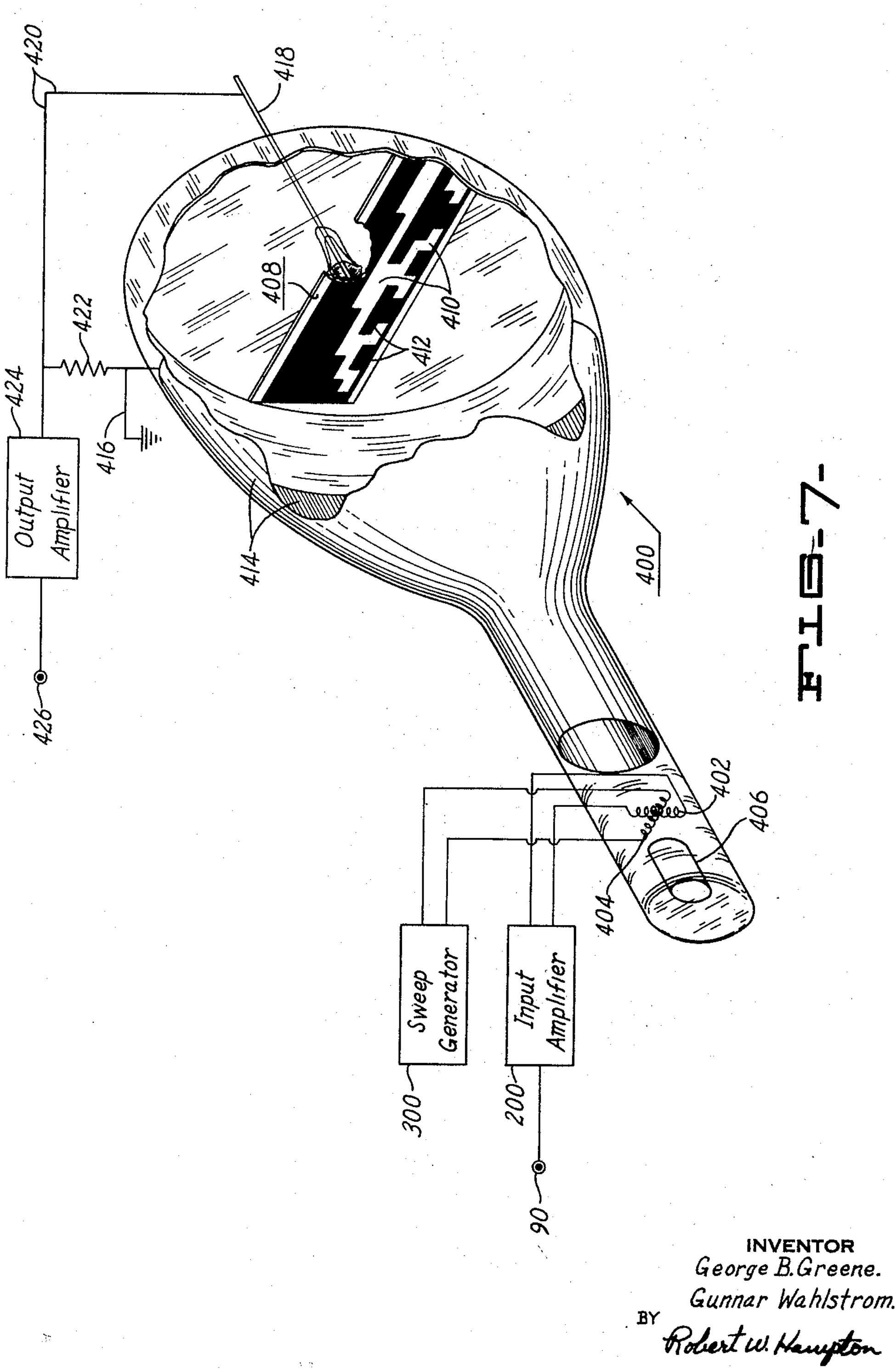
Fig. 7 is a schematic diagram of the encoder and its related circuits.

Referring to Fig. 7, voltages which represent analog values are applied through the terminal 90 to the input amplifier 200, which may, for example, be of the type described as Type No. 9835 in Catalogue No. 77–38–2–2 published by Leeds and Northrup Company. The output of amplifier 200 is applied to a vertical deflection coil 402 of the encoder tube 400. The sweep generator 300 transmits a deflection signal to a horizontal deflection coil 404 in tube 400. The sweep generator can be any appropriate type, such as those shown in Figs. 13.4 and 13.6 of volume 22 of the Radiation Laboratory Series, McGraw-Hill (1948). It is understood that amplifier 200 is required only if the input voltage is of insufficient amplitude to act as a deflection signal in tube 400. If the input voltage amplitude is too great for a deflection signal, amplifier 200 may be replaced by a suitable attenuator.

An electron gun 406 in tube 400 projects an electron beam past the deflection coils 402 and 404 and onto a target plate 408 which comprises a pattern of areas 410, representing 1's and formed by a material which is a relatively good emitter of secondary electrons, and areas 412, representing 0's and formed by a material which is a relatively poor emitter of secondary electrons. These areas are arranged in rows, each row representing a unique word expressed in the reflected binary system. On the target plate shown in Fig. 7, two or more consecutive areas in one row which represent the same digit are formed as one continuous area. The deflection signal from the sweep generator causes the beam to sweep in a direction parallel to the target plate rows, and the amplified analog voltage causes the beam to sweep the particular row which represents a reflected binary word that is some function of the value represented by the analog input voltage. When the electron beam sweeps an area 410 of the target plate, more electrons are emitted than strike the conductor; therefore, a positive pulse appears on the target plate, and the width of each pulse is determined by the number of consecutive 1's that the area represents. The electrons emitted by the target plate are grounded through a collector anode 414 and a lead 416. The positive pulses which are produced at the target plate are conducted by an output pin 418, which extends from the target plate through the envelope of the encoder tube, to a lead 420 which is connected to ground through a bleeder resistor 422. A output amplifier 424, which may be similar to that described on page 260, volume 22 of the Radiation Laboratory Series, supra, is connected to lead 420 and amplifies the output pulses from the target plate of the encoder tube, applying the amplified pulses to an output terminal 426 which is connected to the translator circuit.

*Translator circuit*

The translator circuit employed in the present invention comprises means controlled by the reflected binary pulse train from the encoder for selectively transmitting one or more of a series of clock pulses, to thereby produce an equivalent conventional binary pulse train.

Figure 8:
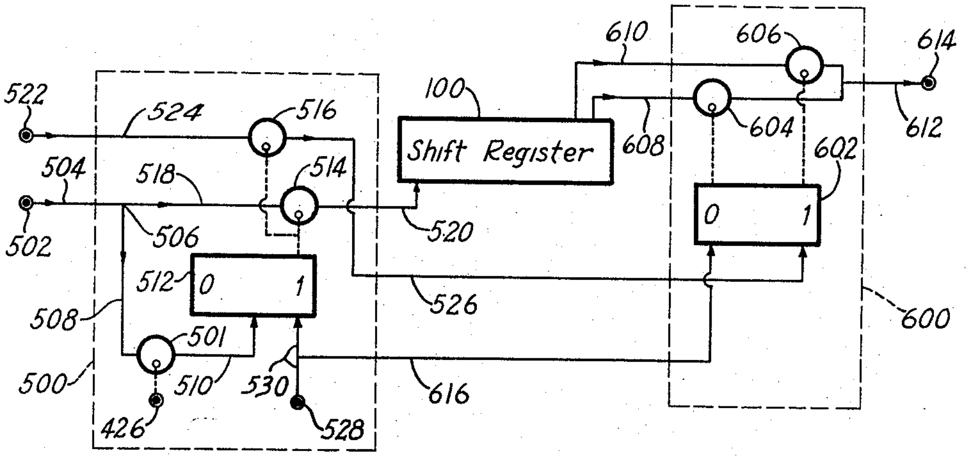
Fig. 8 is a block diagram of the translator and complementer.

Referring to Fig. 8, the output terminal 426 (see also Fig. 7) of the encoder constitutes an arming terminal of a gate 501. This gate is interrogated by a series of clock pulses, one of which is received during each of a series of digit intervals through a clock pulse terminal 502, a lead 504, a junction 506, and a lead 508. The output of gate 501 is connected by a lead 510 to the symmetrical input of a translator trigger circuit 512. A pair of gates 514 and 516 are both armed by the 1 state of trigger 512. Gate 514 is interrogated by the clock pulses through terminal 502, lead 504, junction 506 and a lead 518, and has its output connected by a lead 520 to the 1's input terminal 112 (Fig. 6) of the shift register 100. Gate 516 is interrogated through a complement test terminal 522 and a lead 524, and has its output connected by a lead 526 to the set input of a complementer trigger circuit 602, described hereinafter.

The translator circuit operates in accordance with Equation 1, previously set forth, i. e., it determines each of the successively higher order conventional binary digits by computing the sum of 1 plus the values of the digits in all of the reflected binary orders up to but not including the order corresponding to the conventional binary digit being determined.

Trigger 512 constitutes a conventional binary adder which has only one binary stage and therefore ignores carries in accordance with Equation 1. Each pulse on terminal 426, representing one or more consecutive reflected binary 1's, arms gate 501 during the corresponding digit interval or intervals, thereby permitting the corresponding one or more clock pulses on terminal 502 to each reverse the state of trigger 512 through lead 504, junction 506, lead 508, gate 501 and lead 510, each such reversal of trigger 512 constituting a new sum in accordance with Equations 1 and 2. Gate 514 constitutes a readout circuit wherein the least significant digit of each sum formed by trigger 512 is detected and transmitted to shift register 100. Each clock pulse from terminal 502 interrogates gate 514 and, if trigger 512 stands set to 1, the pulse is transmitted to shift register 100 through lead 520 and represents the entry of a digit 1 into the shift register. It is noted that when a clock pulse finds both gates 501 and 514 armed, it performs two functions, viz: (1) entry of a digit 1 into the shift register; and (2) reversal of the state of trigger 512. The trigger requires a finite time to be reversed and therefore maintains gate 514 armed for a sufficient time to permit the clock pulse to pass through that gate.

Before each series of clock pulses, trigger 512 is set to its 1 state by a preset pulse applied to its set terminal through a terminal 528 and a lead 530. Therefore, the first clock pulse of each series always finds gate 514 armed, so that the first digit entered into register 100 is always a 1. This is the correct first digit for all odd-value conventional binary words, and the complement of the correct first digit for all even-value conventional binary words. The determination of the even or odd nature of each conventional binary word is made by determining whether an even or an odd number of 1's occur in the entire reflected binary word, wherein even-value words contain an even number of 1's and odd-value words contain an odd number of 1's. Therefore, in accordance with Equations 1 and 2, previously set forth, if an odd number of 1's occur in the reflected binary word, the conventional binary word entered into register 100 is in true form; otherwise it is in complementary form. Since trigger 512 is initially set to 1 and since it is reversed each time a digit 1 occurs in the reflected binary word, its final state indicates the complementary or true form of the word entered into register 100. If trigger 512 is in a final 1 state, this indicates that an even number of 1's occurred in the reflected binary word and that the conventional binary word must therefore be complemented. Accordingly, a test pulse is applied through terminal 522 to gate 516 which, if armed, transmits the test pulse to the complementer trigger 602 for enabling the latter.

*Complementer circuit*

At any convenient time, the word standing in register 100 is shifted out of that register and through the complementer circuit into the computer. If the complementer has been enabled by a test pulse from the translator, it complements the shifted word before transmitting it to the computer; otherwise it transmits the word in its original form.

The complementer includes the trigger 602 and a pair of gates 604 and 606 which are armed by the 0 and 1 sides, respectively, of trigger 602. Gate 604 is interrogated through a lead 608 from the 1's output of register 100 (see terminal 121, Fig. 6), and gate 606 is interrogated through a lead 610 from the 0's output of register 100 (see terminal 120, Fig. 6). The outputs of both gates 604 and 606 are joined by a lead 612 to an output terminal 614 to the computer.

When the preset pulse is applied to the translator trigger 512 through terminal 528 and lead 530, as previously described, it is also applied to the reset input of trigger 602 through lead 530 and a lead 616, so that trigger 602 is always preset to its 0 state before each word is shifted into register 100. If trigger 602 remains set to its 0 state when the conventional binary word is shifted out of register 100, then each digit 1 in the shifted word, represented by a pulse on lead 608, is transmitted by the armed gate 604 and entered into the computer as a digit 1 through lead 612 and terminal 614, and 0's pulses on lead 610 are blocked by the unarmed gate 606. On the other hand, if trigger 602 has been set to 1 by a test pulse on lead 526, the 0's pulses on lead 610 are passed through gate 606 and entered into the computer, which receives them as 1's pulses, while the 1's pulses on lead 608 are blocked by gate 604, so that the shifted complementary word is, in effect, converted to its true value before being entered into the computer.

I claim:

1. An analog-to-digital converter comprising: a source of signals, each of said signals constituting an analog representation of a value; an encoder connected to said source for receiving a given one of said signals and for encoding said given signal into a first serial pulse train representing a reflected binary word which is a predetermined function of the value represented by said given signal; a complementer; a translator connected to the encoder to produce in response to the receipt of said first serial pulse train, a second serial pulse train representing the complement of a conventional binary word equivalent to said reflected binary word, said translator being operable to enable said complementer to produce a third serial pulse train representing the true form of said conventional binary word upon receipt at said complementer of said second serial pulse train representing the complement of said conventional binary word; and means for transmitting said second serial pulse train to said complementer.

2. An analog-to-digital converter comprising: a source of signals, each of said signals constituting an analog representation of a value; an encoder connected to said source for receiving a given one of said signals and for encoding said given signal into a first serial pulse train representing a reflected binary word which is a predetermined function of the value represented by said given signal; a complementer normally preset to produce a serial pulse train representing a conventional binary word in response to receipt of a serial pulse train representing the conventional binary word; a translator connected to the encoder to produce in response to the receipt of said first serial pulse train, a second serial pulse train representing a conventional binary word or the complement of said conventional binary word equivalent to said reflected binary word, said translator being operable to enable said complementer to produce, in response to a pulse train representing the complement of a conventional binary word, a pulse train which represents the true form of said last named word; and means for transmitting said second serial pulse train to said complementer.

3. An analog-to-digital converter comprising: a source of signals, each of said signals constituting an analog representation of a value; an encoder connected to said source for receiving a given one of said signals and for encoding said given signal into a first serial pulse train representing a reflected binary word which is a predetermined function of the value represented by said given signal; a translator connected to the encoder and operable in response to the receipt of said first serial pulse train for producing a second serial pulse train representing a conventional binary word or the complement of said conventional binary word, said conventional binary word being equivalent to said reflected binary word; a complementer normally preset to produce a serial pulse train representing a conventional binary word in response to receipt of a serial pulse train representing the conventional binary word; means to enable said complementer to produce, in response to a pulse train representing the complement of a conventional binary word, a pulse train which represents the true form of said last-named word; and means for transmitting said second serial pulse train to said complementer.

4. The combination of: means for producing a first pulse train representing a reflected binary word; a complementer; a translator connected to said producing means and operable in response to the receipt of said first pulse train for producing a second pulse train representing the complement of a conventional binary word which is equivalent to said reflected binary word, said translator being operable to enable said complementer to produce a third serial pulse train representing the true form of said conventional binary word upon receipt at said complementer of said second serial pulse train; and means for transmitting said second serial pulse train to said complementer.

5. The combination of: means for producing a first pulse train representing a reflected binary word; a translator connected to said producing means and operable in response to the receipt of said first pulse train for producing a second pulse train representing the true or complementary form of a conventional binary word which is equivalent to said reflected binary word; a complementer normally preset to produce a serial pulse train representing a conventional binary word in response to receipt of a serial pulse train representing the conventional binary word; means to enable said complementer to produce, in response to a pulse train representing the complement of a conventional binary word, a pulse train which represents the true form of said last-named word; and means for transmitting said second pulse train to the complementer.

6. The combination of: means for producing a first pulse train representing a reflected binary word; means for producing a series of clock pulses in timed relation to said first pulse train; a complementer; a translator operable under control of said first pulse train for selectively transmitting certain ones of said clock pulses to form a second pulse train representing the complement of a conventional binary word which is equivalent to said reflected binary word, said translator being operable to enable said complementer to produce, upon receipt of said second pulse train, a third pulse train representing the true form of said conventional binary word; and means for transmitting said second pulse train to said complementer.

7. The combination of: means for producing a first pulse train representing a reflected binary word; means for producing a series of clock pulses in timed relation to said first pulse train; a translator operable under control of said first pulse train for selectively transmitting certain ones of said clock pulses to form a second pulse train representing the true or complementary form of a conventional binary word which is equivalent to said reflected binary word; a complementer normally preset to produce a serial pulse train representing a conventional binary word in response to receipt of a serial pulse train representing the conventional binary word; means to enable said complementer to produce, in response to a pulse train representing the complement of a conventional binary word, a pulse train which represents the true form of said last-named word; and means for transmitting said second pulse train to the complementer.

8. The combination of: means for producing a first pulse train representing the successively higher order digits $R_1, R_2 \ldots R_n$ of a reflected binary word; a complementer; a translator connected to said producing means and operable under control of said first pulse train to form a second pulse train representing the successively higher order digits of the complement of a conventional binary word according to the equation $C_n=[1-$(the lowest order digit of the conventional binary sum: $1+R_1+R_2= \ldots R_{n-2}+R_{n-1}$)] where $C_1, C_2 \ldots C_n$ designate the successively higher order digits of said conventional binary word, said translator being operable to enable said complementer to produce, upon receipt of said second pulse train, a third pulse train representing the true form of said conventional binary word; and means for transmitting said second pulse train to said complementer.

9. The combination of: means for producing a first pulse train representing the successively higher order digits $R_1, R_2 \ldots R_n$ of a reflected binary word; a translator connected to said producing means and operable under control of said first pulse train to form a second pulse train representing the successively higher order digits of a conventional binary word or its complement, according to the respective equations $C_n=$(the lowest order digit of the conventional binary sum: $1+R_1+R_2+ \ldots R_{n-2}+R_{n-1}$), if an odd number of $R$'s=1, or $C_n=[1-$(the lowest order digit of the conventional binary sum: $1+R_1+R_2= \ldots R_{n-2}+R_{n-1}$)], if an even number of $R$'s=1, where $C_1, C_2 \ldots C_n$ designate the successively higher order digits of said conventional binary word; a complementer normally preset to produce a serial pulse train representing a conventional binary word in response to receipt of a serial pulse train representing the conventional binary word; means for detecting the occurence of an even number of pulses representing R's that equal 1; means under control of said detection means to enable said complementer to produce, in response to a pulse train representing the complement of a conventional binary word, a pulse train which represents the true form of said last-named word; and means for transmitting the second pulse train to the complementer.

10. The combination of: means for producing a first pulse train representing the successively higher order digits $R_1, R_2 \ldots R_n$ of a reflected binary word; a source of clock pulses; a complementer; a translator connected to said source and operable under control of said first pulse train for selectively transmitting certain ones of said clock pulses to form a second pulse train representing the successively higher order digits of the complement of a conventional binary word according to the equation $C_n=[1-$(the lowest order digit of the conventional binary sum: $1+R_1+R_2= \ldots R_{n-2}+R_{n-1}$)], where $C_1, C_2 \ldots C_n$ designate the successively higher order digits of said conventional binary word, said translator being operable to enable said complementer to produce a third pulse train representing the true form of said conventional binary word upon receipt at said complementer of said second pulse train; and means for transmitting said second pulse train to said complementer.

11. The combination of: means for producing a first pulse train representing the successively higher order digits $R_1, R_2 \ldots R_n$ of a reflected binary word; a source of clock pulses; a translator connected to said source and operable under control of said first pulse train for selectively transmitting certain ones of said clock pulses to form a second pulse train representing the successively higher order digits of a conventional binary word or its complement, according to the respective equations $C_n=$(the lowest order digit of the conventional binary sum: $1+R_1+R_2+ \ldots R_{n-2}+R_{n-1}$), if an odd number of $R$'s=1, or $C_n=[1-$(the lowest order digit of the conventional binary sum: $1+R_1+R_2= \ldots R_{n-2}+R_{n-1}$)] if an even number of $R$'s=1, where $C_1, C_2 \ldots C_n$ designate the successively higher order digits of said conventional binary word; a complementer normally preset to produce a serial pulse train representing a conventional binary word in response to receipt of an identical serial pulse train representing the same conventional binary word; means for detecting the occurrence of an even number of pulses representing R's that equal 1; means under control of said detection means to enable said complementer to produce, in response to a pulse train representing the complement of a conventional binary word, a pulse train which represents the true form of said last-named word; and means for transmitting the second pulse train to the complementer.

12. The combination of: a source of reflected binary pulse trains; a translator connected to said source for receiving each reflected binary pulse train and translating the latter into the true or complementary form of an equivalent conventional binary pulse train; a register connected to the translator for receiving said true or complementary conventional binary pulse train and for storing the latter; a normally preset complementer connected to produce a serial pulse train representing a conventional binary word in response to receipt of an identical serial pulse train representing the same conventional binary word; means to enable said complementer to produce, in response to a pulse train representing the complement of a conventional binary word, a pulse train which represents the true form of said last-named word; and means for transmitting the stored conventional binary pulse train to said complementer.

13. In a device for translating a reflected binary pulse train to an equivalent conventional binary pulse train, the combination of: a bistable circuit having a first stable state of operation representing the value 0 and a second stable state representing the value 1; means for initially setting said bistable circuit to its 1 state; means for applying the reflected binary pulse train to said bistable circuit to reverse the state of the latter in response to the occurrence of each representation of a digit 1 in the reflected binary pulse train; more operable preceding the application of each reflected binary digit representation to said bistable circuit for detecting the state of the latter; a register; means for transmitting to said register an ordinal digit representation corresponding to the state of said bistable circuit detected by each operation of said detecting means; means for determining the final state of said bistable circuit following the application to said circuit of the entire reflected binary pulse train; a complementer normally preset to produce a serial pulse train representing a conventional binary word in response to receipt at said complementer of an identical serial pulse train representing the same conventional binary word; and means operable under control of said determining means for enabling said complementer in response to the determination of a final 1 state of said bistable device, said enabled complementer being effective upon receipt of a given pulse train to invert said given pulse train.

References Cited in the file of this patent

UNITED STATES PATENTS

| | | |
|---|---|---|
| 2,590,110 | Lippel | Mar. 25, 1952 |
| 2,632,058 | Gray | Mar. 17, 1953 |
| 2,660,618 | Aigrain | Nov. 24, 1953 |
| 2,678,254 | Schenck | May 11, 1954 |
| 2,679,644 | Lippel | May 25, 1954 |
| 2,711,499 | Lippel | June 21, 1955 |
| 2,755,459 | Carbrey | July 17, 1956 |
| 2,762,564 | Samson | Sept. 11, 1956 |

OTHER REFERENCES

Proc. of the National Electronics Conference, 1952, "A Transistor Optical Position Encoder and Digit Register," by Follingstad et al. (pages 766 to 775).

IRE Professional Group on Electronic Computers, "An Analog-to-Digital Converter," by Scarbrough, pages 5 to 7, September 1953.